(12) United States Patent
Barrett et al.

(10) Patent No.: US 8,275,922 B2
(45) Date of Patent: Sep. 25, 2012

(54) IMPLEMENTING SERIAL LINK TRAINING PATTERNS SEPARATED BY RANDOM DATA FOR TRAINING A SERIAL LINK IN AN INTERCONNECT SYSTEM

(75) Inventors: Wayne Melvin Barrett, Rochester, MN (US); Kenneth Michael Valk, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 243 days.

(21) Appl. No.: 12/709,733

(22) Filed: Feb. 22, 2010

(65) Prior Publication Data
US 2011/0206141 A1 Aug. 25, 2011

(51) Int. Cl.
*G06F 13/42* (2006.01)
(52) U.S. Cl. .................. 710/106; 710/104; 710/105
(58) Field of Classification Search .......... 710/306–317, 710/104–124, 8–19, 33–38; 375/240, 354, 375/130, 367; 370/474; 713/51–52
See application file for complete search history.

(56) References Cited

U.S. PATENT DOCUMENTS

| | | | | |
|---|---|---|---|---|
| 5,237,593 | A * | 8/1993 | Fisher et al. ............. | 375/367 |
| 7,010,607 | B1 * | 3/2006 | Bunton ..................... | 709/228 |
| 7,444,558 | B2 * | 10/2008 | Mitbander et al. ........ | 714/716 |
| 7,492,807 | B1 * | 2/2009 | Buchmann et al. ........ | 375/130 |
| 7,711,878 | B2 * | 5/2010 | Cherukuri et al. ........ | 710/106 |
| 7,769,048 | B2 * | 8/2010 | Sharma ..................... | 370/474 |
| 2005/0286567 | A1 * | 12/2005 | Cherukuri et al. ........ | 370/507 |
| 2008/0260082 | A1 * | 10/2008 | Panikkar et al. .......... | 375/354 |
| 2009/0034728 | A1 | 2/2009 | Goergen et al. | |
| 2010/0008460 | A1 * | 1/2010 | Zhang et al. ............. | 375/376 |

OTHER PUBLICATIONS

"High Speed Serdes Devices and Applications" by David Robert Stauffer et al., 1st edition Oct. 23, 2008; Sec. 5.3.5, pp. 213-218 http://books.google.com/books?id=Cx3r0H-4AhEC&pg=PA214 &lpg=PA214&dg=prbs+%22training+pattern%22&source=bl &ots=vITDED7g1B&sig=16NrIIKnzGnUmxZ__PDdebNfmiZ0 &hl=en&ei=_ub5Sp_GHpOONr_ujdMK&sa=X &oi=book_ result&ct=result&resnum=1&ved=0CAoQ6AEwAA#v=onepage &q=prbs%20%22training%20pattern%.
Backplane Ethernet Specification http://grouper.ieee.org/groups/802/3/ap/public/sep05/abler_01_0905.pdf.
HyperTransport I/O Link Specification Revision 3.00 Apr. 21, 2006; Section 2.2 Gen3 Scrambling, pp. 43-45.

* cited by examiner

*Primary Examiner* — Raymond Phan
(74) *Attorney, Agent, or Firm* — Joan Pennington

(57) ABSTRACT

A method and circuit for implementing serial link training sequences, and a design structure on which the subject circuit resides are provided. A transmitter device transmits a training sequence (TS) pattern; then the transmitter device transmits random data for a predefined time duration. The steps of transmitting the TS-pattern, then transmitting the random data for the fixed time duration are repeated. A receiver device detecting a plurality of the TS-patterns separated by the predefined time interval of random data, performs receiver initialization steps. The receiver device performs a plurality of receiver initialization steps including, for example, acquiring byte lock, and a link width determination.

24 Claims, 9 Drawing Sheets

300

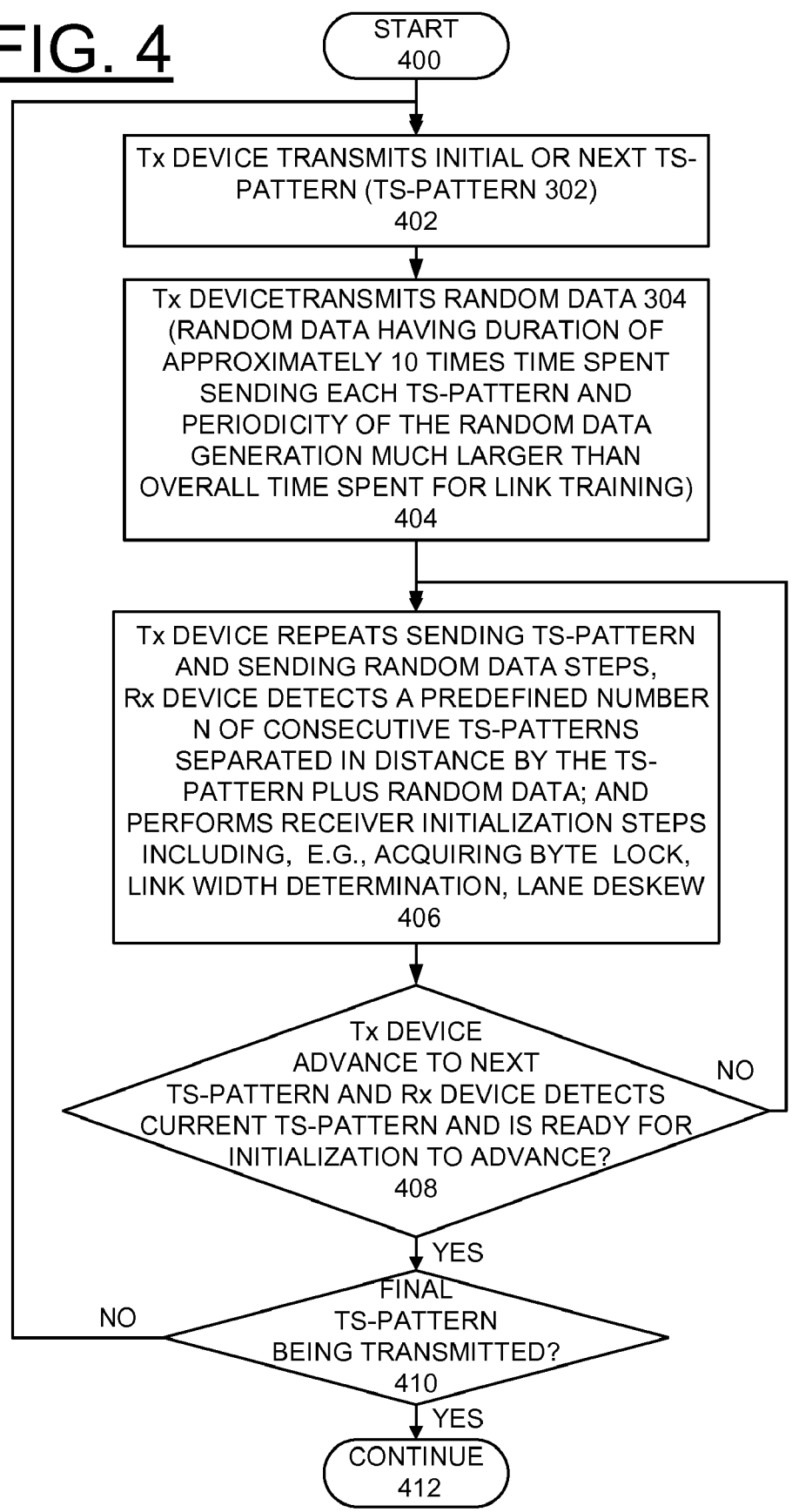

IMPLEMENTING SERIAL LINK TRAINING PATTERNS SEPARATED BY RANDOM DATA FOR TRAINING A SERIAL LINK IN AN INTERCONNECT SYSTEM

FIELD OF THE INVENTION

The present invention relates generally to the data processing field, and more particularly, relates to a method and circuits for implementing serial link training patterns separated by random data, and a design structure on which the subject circuit resides.

DESCRIPTION OF THE RELATED ART

High speed serial (HSS) links are used for communications in various known computer chips and computer systems. High speed serial links typically are initialized or trained by the transmission and reception of a special Link Training Sequence (LTS).

In conventional HSS link arrangements, the Link Training Sequence (LTS) typically includes repeatedly sending a fixed training sequence (TS)-pattern. A particular TS-pattern, and its possible variants, are repeatedly sent by the transmitter to convey information to the receiver and to allow the receiver to perform various initialization steps. These receiver initialization steps include, for example, acquiring byte lock, a link width determination, and lane deskew.

In such prior art arrangements, repeatedly sending a fixed pattern on a serial link can introduce problems, which it is desirable to avoid. Some problems resulting from the use of a fixed repeating pattern include: (a) lack of perfect DC balancing within the bit stream; (b) electromagnetic interference (EMI) radiation is concentrated on specific frequencies; and (c) difficulty of the receiver (Rx) in acquiring bit lock while receiving a repeating fixed pattern, as compared to an optimal random pattern.

A need exists for an effective method and circuit to implement enhanced serial link training sequences. Such method and circuit are needed so that many problems of conventional serial link training arrangements using fixed repeating training sequence patterns are substantially eliminated.

SUMMARY OF THE INVENTION

Principal aspects of the present invention are to provide a method and circuits for implementing serial link training patterns separated by random data, and a design structure on which the subject circuit resides. Other important aspects of the present invention are to provide such method, circuitry, and design structure substantially without negative effect and that overcome many of the disadvantages of prior art arrangements.

In brief, a method and circuits for implementing serial link training sequences, and a design structure on which the subject circuit resides are provided. A transmit device coupled to the serial link transmits a training sequence (TS) pattern, then the transmit device transmits random data for a predefined time duration. The steps of transmitting the training sequence (TS) pattern, then transmitting the random data for the fixed time duration are repeated.

In accordance with features of the invention, a multiple-path local rack interconnect system includes a plurality of interconnect chips, and a plurality of serial links connected between each of the plurality of interconnect chips. Each of the interconnect chips includes a link interface for implementing serial link training patterns separated by random data. The link interface includes a transmit device coupled to the serial link for transmitting data and a receiver device coupled to the serial link for receiving data. The transmit device transmits a training sequence (TS) pattern; then the transmit device transmits random data for a predefined time duration. The steps of transmitting the training sequence (TS) pattern, then transmitting the random data for the fixed time duration are repeated.

In accordance with features of the invention, the predefined time duration of the transmitted random data is about ten times longer than the time interval of the transmitted random data training sequence (TS) pattern. The periodicity of the random data generation is much larger than the overall time spent performing serial link training sequences.

In accordance with features of the invention, the receiver device detecting a plurality of the TS-patterns separated by the predefined time interval of random data, performs receiver initialization steps. The receiver device performs a plurality of receiver initialization steps including, for example, acquiring byte lock, a link width determination, and lane deskew.

In accordance with features of the invention, the transmitted training sequence (TS) patterns with the random data inserted between each TS-pattern enable acquiring bit lock by the receiver device in an optimized amount of time. The transmitted TS-patterns with the random data inserted between each TS-pattern provide enhanced DC balancing of the bit stream as compared to repeatedly sending TS-patterns.

In accordance with features of the invention, the transmitted TS-patterns with the random data inserted between each TS-pattern provide electromagnetic interference (EMI) radiation effectively distributed among various frequencies. The TS-patterns with the random data inserted between each TS-pattern enable a longer link training sequence as compared to a time-limit for repeatedly sending TS-patterns of prior art arrangements.

BRIEF DESCRIPTION OF THE DRAWINGS

The present invention together with the above and other objects and advantages may best be understood from the following detailed description of the preferred embodiments of the invention illustrated in the drawings, wherein:

FIG. 4 is a flow chart illustrating exemplary operations performed by the high speed serial link circuit of FIG. 2 for implementing serial link training patterns separated by random data in accordance with the preferred embodiment.

DETAILED DESCRIPTION OF THE PREFERRED EMBODIMENTS

In the following detailed description of embodiments of the invention, reference is made to the accompanying drawings, which illustrate example embodiments by which the invention may be practiced. It is to be understood that other embodiments may be utilized and structural changes may be made without departing from the scope of the invention.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

In accordance with features of the invention, circuits and methods are provided for implementing an enhanced Link Training Sequence (LTS) that substantially eliminates all risks introduced by sending a repeated fixed TS-pattern during the Link Training Sequence. The circuits and methods substantially eliminate any time-limit constraints for sending the Link Training Sequence.

Figure 1A:
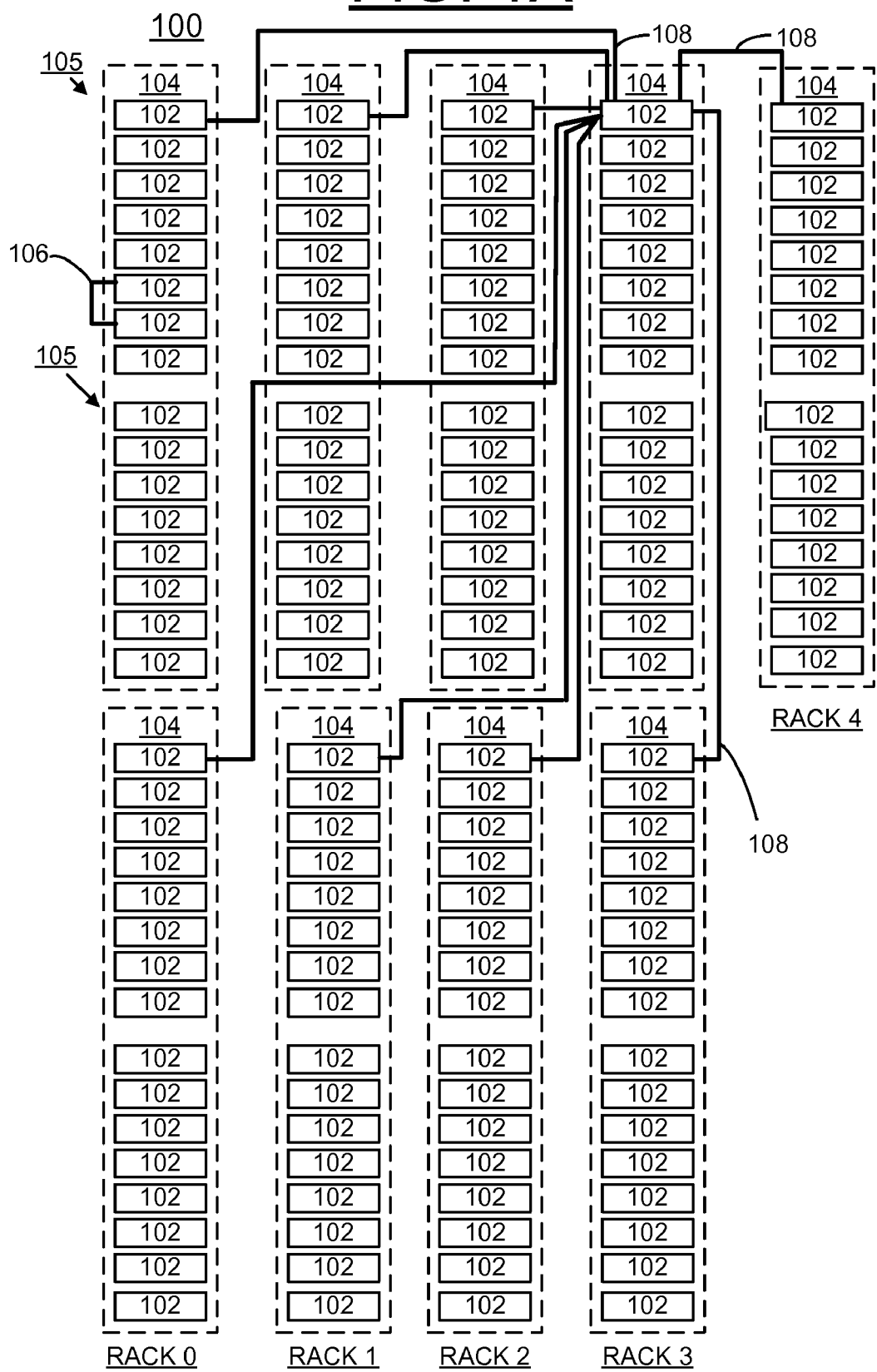
FIGS. 1A, 1B, 1C, 1D, and 1E are respective schematic and block diagrams illustrating an exemplary a local rack interconnect system for implementing serial link training patterns separated by random data in accordance with the preferred embodiment.

Having reference now to the drawings, in FIG. 1A, there is shown an example multiple-path local rack interconnect system generally designated by the reference character 100 used for implementing serial link training patterns separated by random data in accordance with the preferred embodiment. The multiple-path local rack interconnect system 100 supports computer system communications between multiple servers, and enables an Input/Output (IO) adapter to be shared across multiple servers. The multiple-path local rack interconnect system 100 supports network, storage, clustering and Peripheral Component Interconnect Express (PCIe) data traffic.

The multiple-path local rack interconnect system 100 includes a plurality of interconnect chips 102 in accordance with the preferred embodiment arranged in groups or super nodes 104. Each super node 104 includes a predefined number of interconnect chips 102, such as 16 interconnect chips, arranged as a chassis pair including a first and a second chassis group 105, each including 8 interconnect chips 102. The multiple-path local rack interconnect system 100 includes, for example, a predefined maximum number of nine super nodes 104. As shown, a pair of super nodes 104 are provided within four racks or racks 0-3, and a ninth super node 104 is provided within the fifth rack or rack 4.

In FIG. 1A, the multiple-path local rack interconnect system 100 is shown in simplified form sufficient for understanding the invention, with one of a plurality of local links (L-links) 106 shown between a pair of the interconnect chips 102 within one super node 104. The multiple-path local rack interconnect system 100 includes a plurality of L-links 106 connecting together all of the interconnect chips 102 of each super node 104. A plurality of distance links (D-links) 108, or as shown eight D-links 108 connect together the example nine super nodes 104 together in the same position in each of the other chassis pairs. Each of the L-links 106 and D-links 108 comprises a bi-directional (×2) high-speed serial (HSS) link.

Figure 1B:
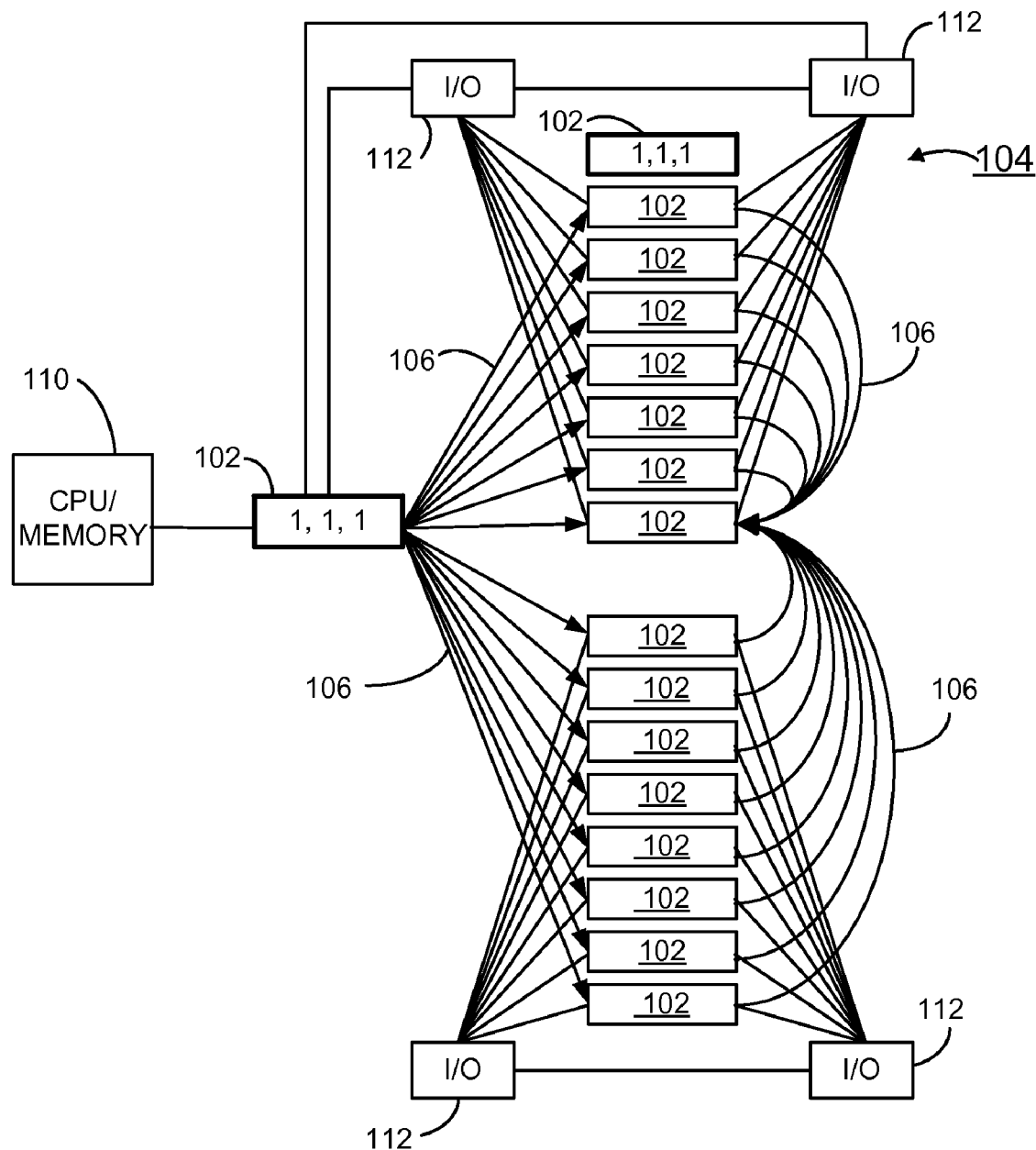
Figure 1C:
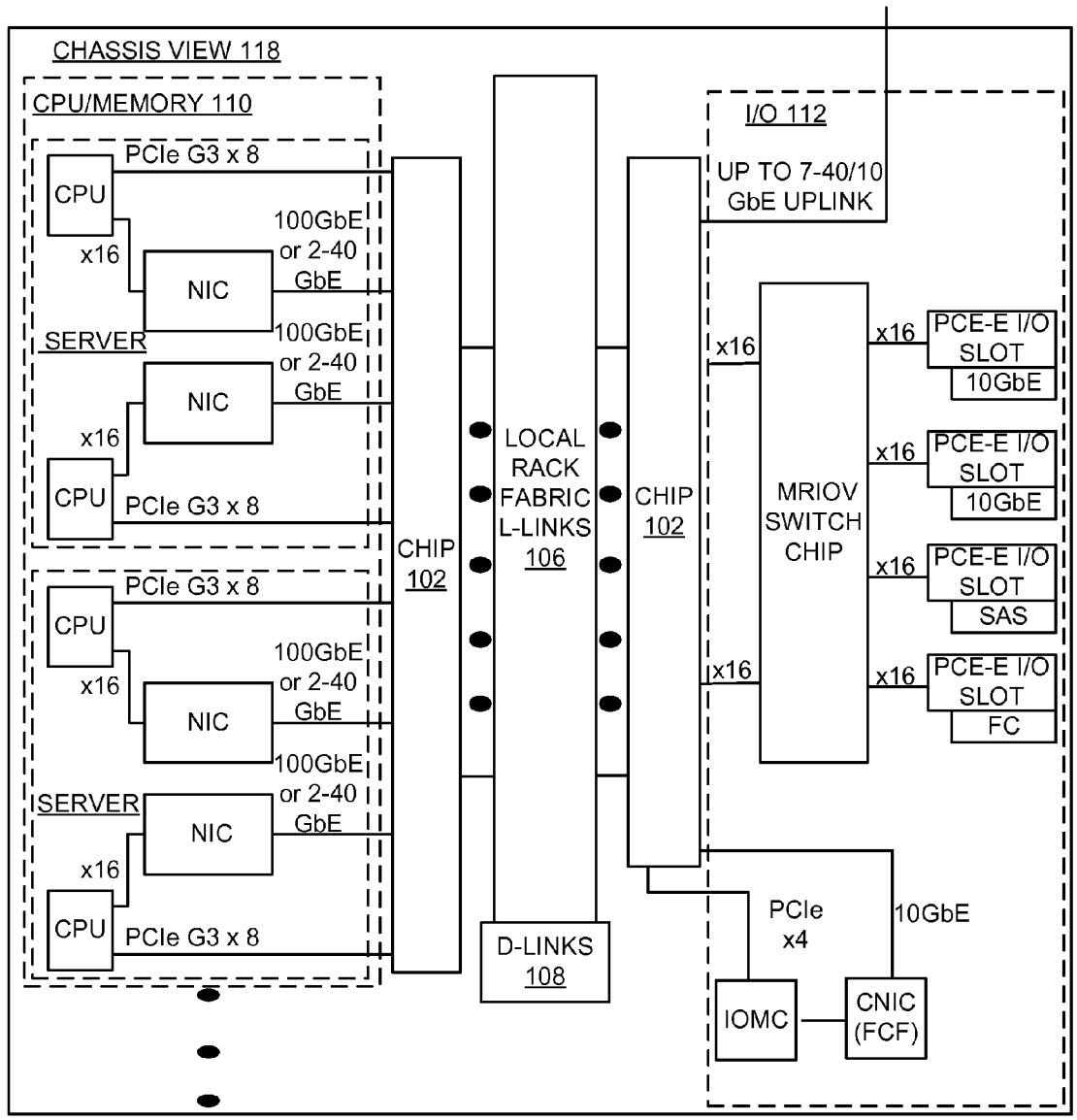
Figure 1D:
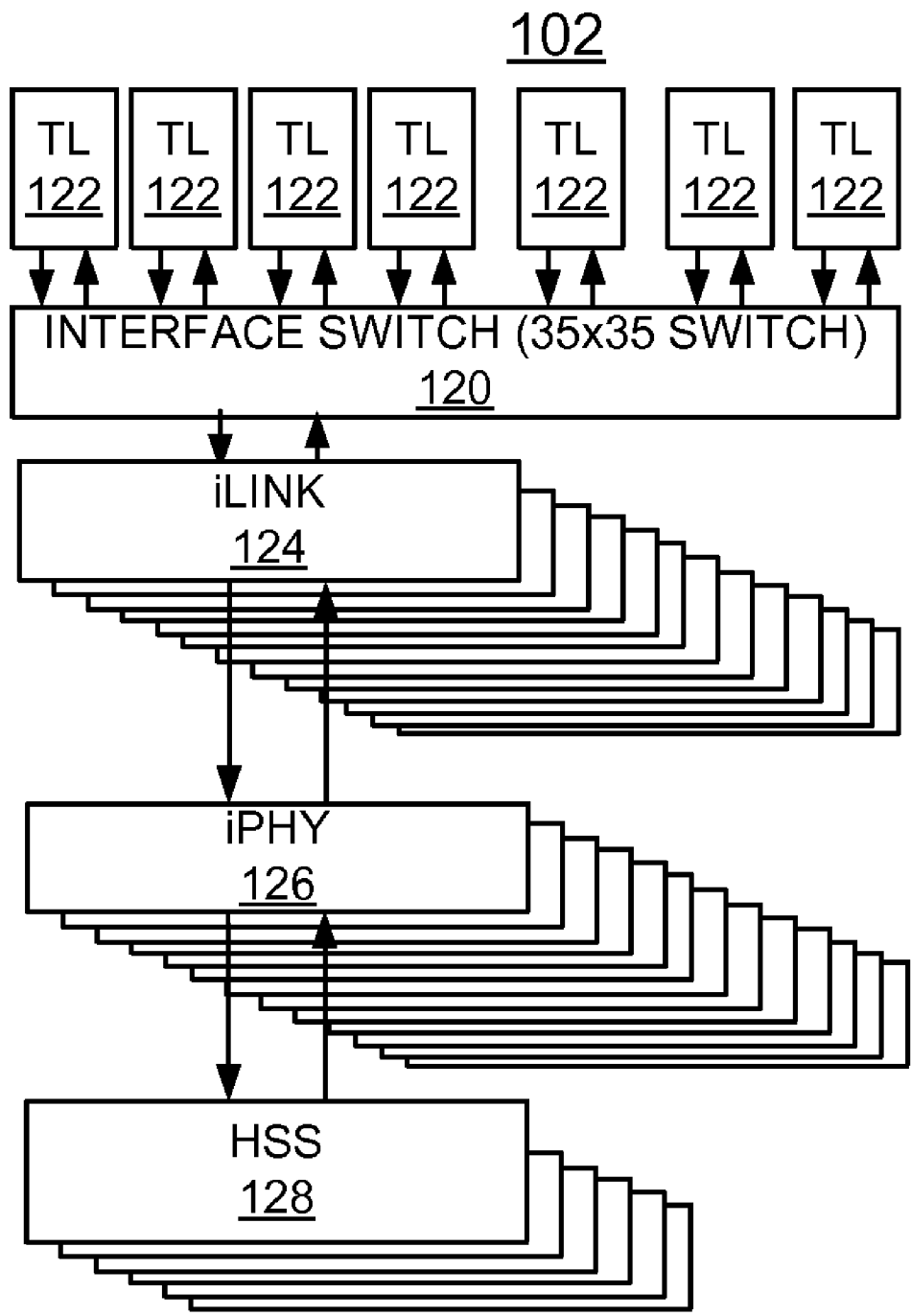
Figure 1E:
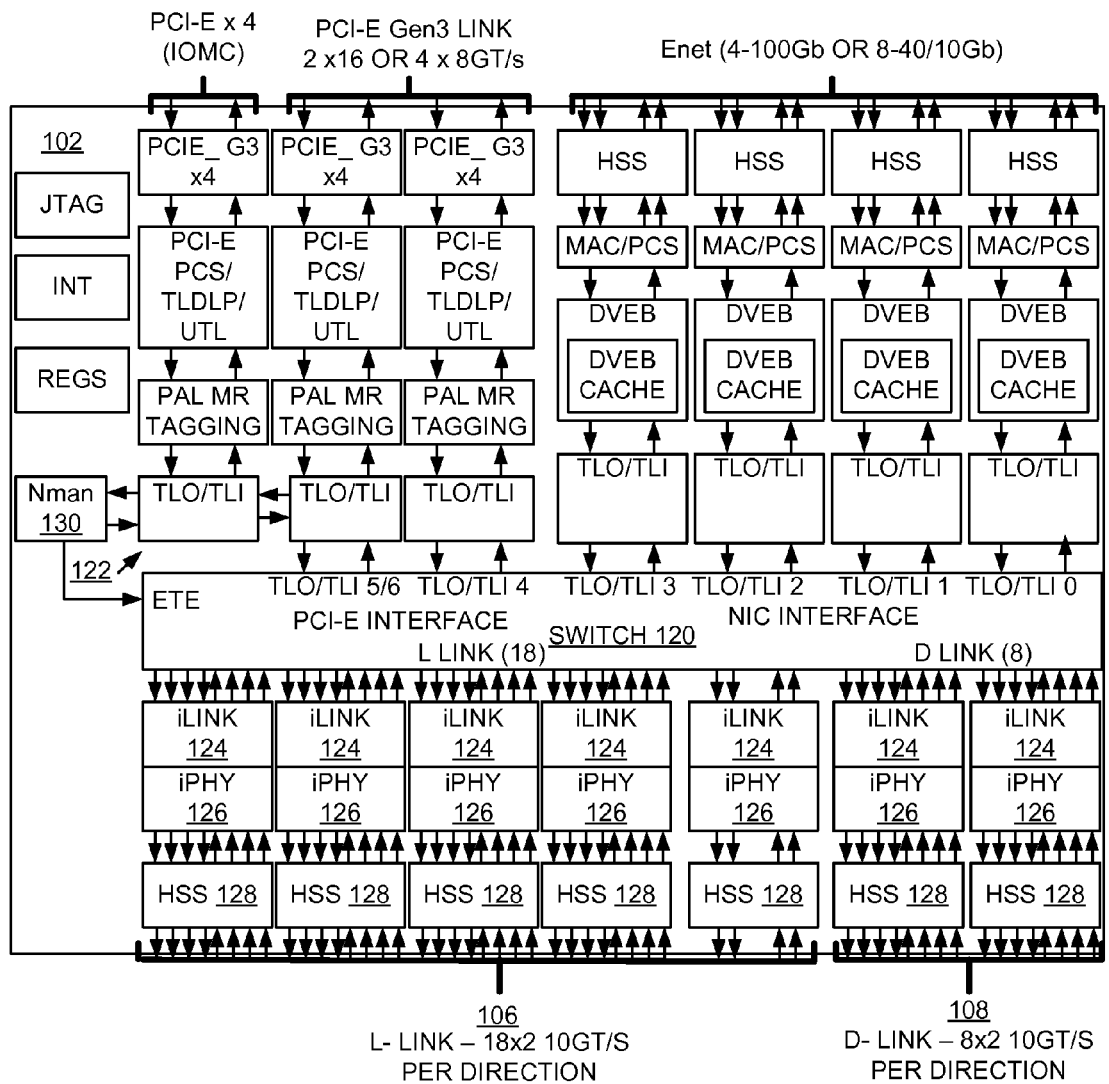

Referring also to FIG. 1E, each of the interconnect chips 102 of FIG. 1A includes, for example, 18 L-links 106, labeled 18×2 10 GT/S PER DIRECTION and 8 D-links 108, labeled 8×2 10 GT/S PER DIRECTION.

Referring also to FIGS. 1B and 1C, multiple interconnect chips 102 defining a super node 104 are shown connected together in FIG. 1B. A first or top of stack interconnect chip 102, labeled 1,1,1 is shown twice in FIG. 1B, once off to the side and once on the top of the stack. Connections are shown to the illustrated interconnect chip 102, labeled 1,1,1 positioned on the side of the super node 104 including a plurality of L-links 106 and a connection to a device 110, such as a central processor unit (CPU)/memory 110. A plurality of D links 108 or eight D-links 108 as shown in FIG. 1A, (not shown in FIG. 1B) are connected to the interconnect chips 102, such as interconnect chip 102, labeled 1,1,1 in FIG. 1B.

As shown in FIG. 1B, each of a plurality of input/output (I/O) blocks 112, is connected to respective interconnect chips 102, and respective ones of the I/O 112 are connected together. A source interconnect chip 102, such as interconnect chip 102, labeled 1,1,1 transmits or sprays all data traffic across all L-links 106. A local I/O 112 may also use a particular L-link 106 of destination I/O 112. For a destination inside a super node 104, or chassis pair of first and second chassis group 105, a source interconnect chip or an intermediate interconnect chip 102 forwards packets directly to a destination interconnect chip 102 over an L-link 106. For a destination outside a super node 104, a source interconnect chip or an intermediate interconnect chip 102 forwards packets to an interconnect chip 102 in the same position on the destination super node 104 over a D-link 108. The interconnect chip 102 in the same position on the destination super node 104 forwards packets directly to a destination interconnect chip 102 over an L-link 106.

In the multiple-path local rack interconnect system 100, the possible routing paths with the source and destination interconnect chips 102 within the same super node 104 include a single L-link 106; or a pair of L-links 106. The possible routing paths with the source and destination interconnect chips 102 within different super nodes 104 include a single D-link 108 (D); or a single D-link 108, and a single L-link 106 (D-L); or a single L-link 106, and single D-link 108 (L-D); or a single L-link 106, a single D-link 108, and a single L-link 106 (L-D-L). With an unpopulated interconnect chip 102 or a failing path, either the L-link 106 or D-link 108 at the beginning of the path is removed from a spray list at the source interconnect 102.

As shown in FIGS. 1B and 1C, a direct path is provided from the central processor unit (CPU)/memory 110 to the interconnect chips 102, such as chip 102, labeled 1,1,1 in FIG. 1B, and from any other CPU/memory connected to another respective interconnect chip 102 within the super node 104.

Referring now to FIG. 1C, a chassis view generally designated by the reference character 118 is shown with a first of a pair of interconnect chips 102 connected a central processor unit (CPU)/memory 110 and the other interconnect chip 102 connected to input/output (I/O) 112 connected by local rack fabric L-links 106, and D-links 108. Example connections shown between each of an illustrated pair of servers within the CPU/memory 110 and the first interconnect chip 102 include a Peripheral Component Interconnect Express (PCIe) G3×8, and a pair of 100 GbE or 2-40 GbE to a respective Network Interface Card (NIC). Example connections of the other interconnect chip 102 include up to 7-40/10 GbE Uplinks, and example connections shown to the I/O 112 include a pair of PCIe G3×16 to an external MRIOV switch chip, with four×16 to PCI-E I/O Slots with two Ethernet slots indicated 10 GbE, and two storage slots indicated as SAS (serial attached SCSI) and FC (fibre channel), a PCIex4 to a IOMC and 10 GbE to CNIC (FCF).

Referring now to FIGS. 1D and 1E, there are shown block diagram representations illustrating an example interconnect chip 102. The interconnect chip 102 includes an interface switch 120 connecting a plurality of transport layers (TL) 122, such as 7 TLs, and interface links (iLink) layer 124 or 26 iLinks. An interface physical layer protocol, or iPhy 126 is coupled between the interface links layer iLink 124 and high speed serial (HSS) interface 128, such as 7 HSS 128. As shown in FIG. 1E, the 7 HSS 128 are respectively connected to the illustrated 18 L-links 106, and 8 D-links 108. In the example implementation of interconnect chip 102, 26 connections including the illustrated 18 L-links 106, and 8 D-links 108 to the 7 HSS 128 are used, while the 7 HSS 128 would support 28 connections.

The TLs 122 provide reliable transport of packets, including recovering from broken chips 102 and broken links 106, 108 in the path between source and destination. For example, the interface switch 120 connects the 7 TLs 122 and the 26 iLinks 124 in a crossbar switch, providing receive buffering for iLink packets and minimal buffering for the local rack interconnect packets from the TLO 122. The packets from the TL 122 are sprayed onto multiple links by interface switch 120 to achieve higher bandwidth. The iLink layer protocol 124 handles link level flow control, error checking CRC generating and checking, and link level retransmission in the event of CRC errors. The iPhy layer protocol 126 handles training sequences, lane alignment, and scrambling and descrambling. The HSS 128, for example, are 7×8 full duplex cores providing the illustrated 26×2 lanes.

In FIG. 1E, a more detailed block diagram representation illustrating the example interconnect chip 102 is shown. Each of the 7 transport layers (TLs) 122 includes a transport layer out (TLO) partition and transport layer in (TLI) partition. The TLO/TLI 122 respectively receives and sends local rack interconnect packets from and to the illustrated Ethernet (Enet), and the Peripheral Component Interconnect Express (PCI-E), PCI-E×4, PCI-3 Gen3 Link respectively via network adapter or fabric adapter, as illustrated by blocks labeled high speed serial (HSS), media access control/physical coding sub-layer (MAC/PCS), distributed virtual Ethernet bridge (DVEB); and the PCIE_G3×4, and PCIE_G3 2×8, PCIE_G3 2×8, a Peripheral Component Interconnect Express (PCIe) Physical Coding Sub-layer (PCS) Transaction Layer/Data/Link Protocol (TLDLP) Upper Transaction Layer (UTL), PCIe Application Layer (PAL MR) TAGGING to and from the interconnect switch 120. A network manager (NMan) 130 coupled to interface switch 120 uses End-to-End (ETE) small control packets for network management and control functions in multiple-path local rack interconnect system 100. The interconnect chip 102 includes JTAG, Interrupt Handler (INT), and Register partition (REGS) functions.

In accordance with features of the invention, a protocol method and circuit are provided for implementing an enhanced Link Training Sequence (LTS). A plurality of LTS operations includes separating the training sequence (TS) pattern by a predefined time interval and sending random data during that separation. The duration of each random data transmission is approximately ten times (10×) the amount of time spent sending each TS-pattern. The periodicity of the random data generation is much larger than the overall time spent performing link training.

Figure 2:
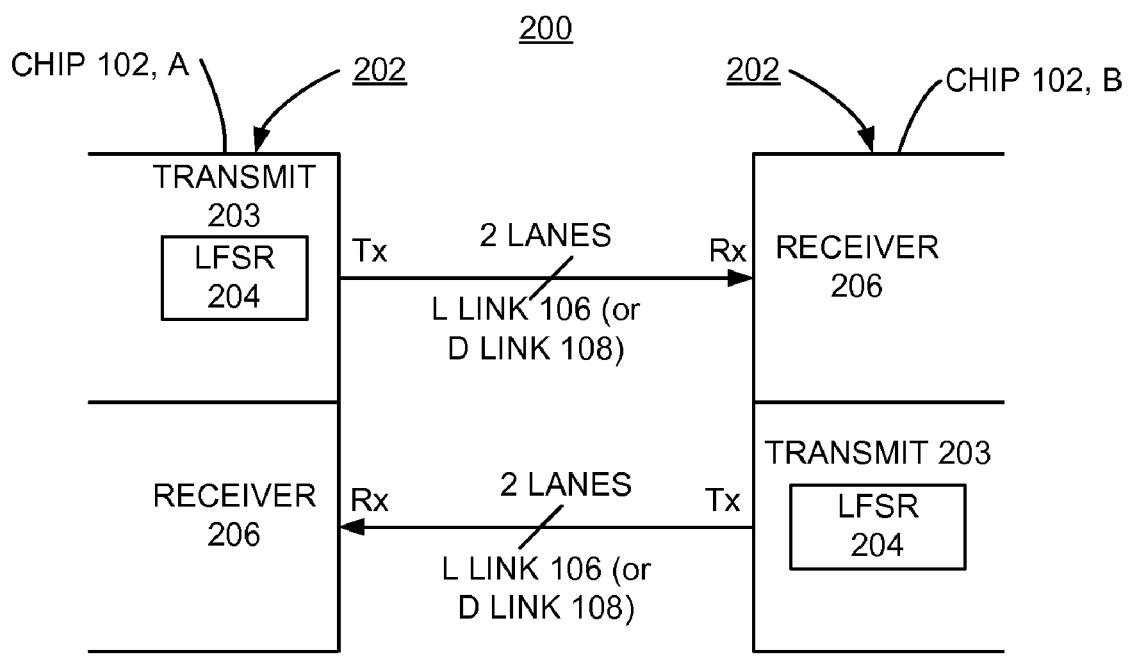
FIG. 2 illustrates a single high speed serial link circuit including Linear Feedback Shift Registers (LFSRs) of the interconnect chip of FIGS. 1A-1E for implementing serial link training patterns separated by random data in accordance with the preferred embodiment.

Referring now to FIG. 2, there is shown a single high speed serial link circuit generally designated by the reference character 200 for implementing serial link training patterns separated by random data in accordance with the preferred embodiment. The single high speed serial link circuit 200 includes a respective HSS interface circuit designated by the reference character 202 included in each interconnect chip 102, A and B connected by L-link 106 or D-link 108. The HSS interface circuit 202 includes a respective transmit device 203 and a transmit Linear Feedback Shift Register (LFSR) 204 coupled to the transmit side of an L link 106 or a D link 108 of the high speed serial link circuit 200. The HSS interface circuit 202 includes a respective receiver 206 coupled to a receive side of the L link 106 or the D link 108 of the high speed serial link circuit 200. The high speed serial (HSS) link circuit 200 is implemented in the HSS interface 128 of the interconnect chip 102 shown in FIGS. 1D and 1E.

Figure 3A:
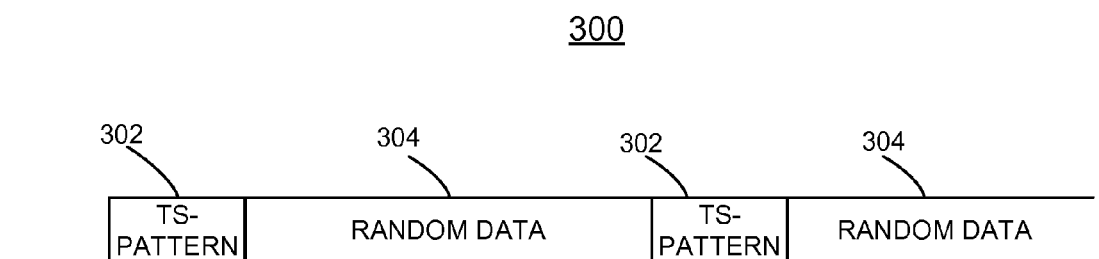
FIG. 3A illustrates an example link training sequence performed by the high speed serial link circuit of FIG. 2 including a plurality of the training sequence (TS) patterns separated by the predefined time interval with inserted random data in accordance with the preferred embodiment.

FIG. 3A illustrates an example portion of a Link Training Sequence (LTS) generally designated by the reference character 300 performed by the high speed serial link circuit 200 of FIG. 2. The LTS 300 includes a plurality of the training sequence (TS) patterns 302 separated by the predefined time interval with inserted random data 304 in accordance with the preferred embodiment. Each TS-pattern 302 includes a predefined link packet format containing header information and data with the header information identifying different TS-patterns from an initial or first TS-pattern 302 through a final TS-pattern transmitted in the Link Training Sequence (LTS).

Figure 3B:
FIG. 3B illustrates a prior art link training sequence including fixed repeating training sequence patterns.

FIG. 3B illustrates a prior art link training sequence including fixed repeating training sequence patterns. In the method of the invention by forcing a large proportion of the Link Training Sequence 300 to be random data 304 separating the TS-patterns 302, advantages over prior art arrangements are gained.

In accordance with features of the invention, implementing an enhanced Link Training Sequence (LTS) of the invention substantially eliminates all risks introduced by sending repeated fixed TS-patterns during the Link Training Sequence (LTS). The circuits and methods of the invention provide improved DC balancing of the bit stream, effective EMI radiation distribution among various frequencies, and optimized time for obtaining Rx bit lock, while substantially eliminating any time-limit constraints for sending the Link Training Sequence (LTS) with the LFSRs 204 transmitting random data 304 separating the TS-patterns 302.

For example, the duration of each random data transmission has a predefined fixed value, and should be at least approximately ten times the amount of time spent sending each TS-pattern in a preferred embodiment of the invention. However, it should be understood that the present invention is not limited to this example time duration, for example, a smaller or longer duration of each random data transmission relative to the amount of time spent sending each TS-pattern can be used.

Referring now to FIG. 4, there are shown exemplary operations performed by the high speed serial link circuit 200 for implementing the Link Training Sequence (LTS) with serial link training patterns separated by random data in accordance with the preferred embodiment. The LTS starts as indicated at a block 400. A transmit (Tx) device 203 of chip 102, A, transmits an initial TS-pattern 302 to a receive Rx device 206 of chip 102, B, as indicated at a block 402. The transmit LFSR 204 of chip 102, A, transmits random data to the receive Rx device 206 of chip 102, B, as indicated at a block 404. During the LTS operations, the receive Rx device 206 of chip 102, B looks for header information of TS-patterns separated by the predefined distance.

As indicated at a block 406, the transmit device 203 and LFSR 204 of chip 102, A, repeat the transmitting steps of blocks 402 and 404, with transmitting the TS-pattern, then transmitting random data to the receive Rx device 206 of chip 102, B, and the Rx device detects header information of TS-patterns separated by the predefined distance for a set number N consecutive TS-patterns separated by the predefined distance, and the Rx device performs set receiver initialization steps. The Rx device performs set receiver initialization steps including, for example, acquiring byte lock, a link width determination, and lane deskew. Checking whether the transmit device or LFSR 204 should advance to a next TS-pattern and the Rx device detects the current TS-pattern is performed as indicated at a decision block 408. For example, advancing to a next TS-pattern is determined with the Rx device at the transmit device 203 receiving back the current TS-pattern and the current operations of the LTS step are done at decision block 408. If the transmit device 203 should not advance to a next TS-pattern, then the LTS operations continue returning to block 406 and the transmit device 203 and LFSR 204 respectively repeat transmitting the current TS-pattern, and transmitting random data to the receive Rx device 206.

When determined that the transmit device 203 should advance to a next TS-pattern and the Rx device detects the current TS-pattern, then checking whether the final TS-pattern is being transmitted as indicated by the header information of the current TS-pattern as indicated at a decision block 410. If the final TS-pattern is not being transmitted, then the transmit device transmits the next TS-pattern continuing at block 402. Otherwise the LTS operations continue as indicated at a block 412.

Figure 5:
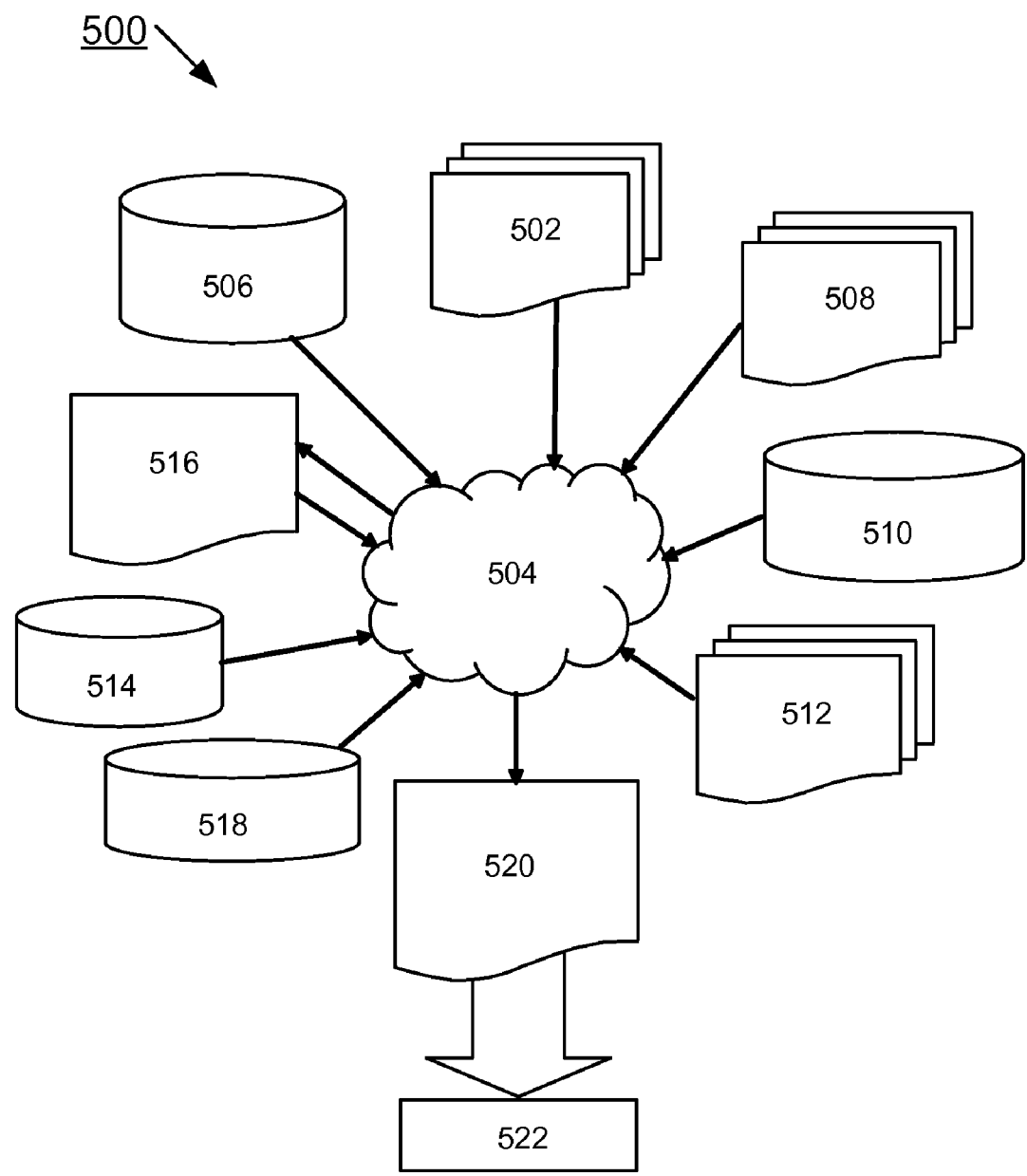
FIG. 5 is a flow diagram of a design process used in semiconductor design, manufacturing, and/or test.

FIG. 5 shows a block diagram of an example design flow 500 that may be used for high speed serial link circuit and the interconnect chip described herein. Design flow 500 may vary depending on the type of IC being designed. For example, a design flow 500 for building an application specific IC (ASIC) may differ from a design flow 500 for designing a standard component. Design structure 502 is preferably an input to a design process 504 and may come from an IP provider, a core developer, or other design company or may be generated by the operator of the design flow, or from other sources. Design structure 502 comprises circuits 102, 200 in the form of schematics or HDL, a hardware-description language, for example, Verilog, VHDL, C, and the like. Design structure 502 may be contained on one or more machine readable medium. For example, design structure 502 may be a text file or a graphical representation of circuits 102, 200. Design process 504 preferably synthesizes, or translates, circuits 102, 200 into a netlist 506, where netlist 506 is, for example, a list of wires, transistors, logic gates, control circuits, I/O, models, etc. that describes the connections to other elements and circuits in an integrated circuit design and recorded on at least one of machine readable medium. This may be an iterative process in which netlist 506 is resynthesized one or more times depending on design specifications and parameters for the circuits.

Design process 504 may include using a variety of inputs; for example, inputs from library elements 508 which may house a set of commonly used elements, circuits, and devices, including models, layouts, and symbolic representations, for a given manufacturing technology, such as different technology nodes, 32 nm, 45 nm, 90 nm, and the like, design specifications 510, characterization data 512, verification data 514, design rules 516, and test data files 518, which may include test patterns and other testing information. Design process 504 may further include, for example, standard circuit design processes such as timing analysis, verification, design rule checking, place and route operations, and the like. One of ordinary skill in the art of integrated circuit design can appreciate the extent of possible electronic design automation tools and applications used in design process 504 without deviating from the scope and spirit of the invention. The design structure of the invention is not limited to any specific design flow.

Design process 504 preferably translates an embodiment of the invention as shown in FIGS. 1A-1E, 2, 3A, and 4 along with any additional integrated circuit design or data (if applicable), into a second design structure 520. Design structure 520 resides on a storage medium in a data format used for the exchange of layout data of integrated circuits, for example, information stored in a GDSII (GDS2), GL1, OASIS, or any other suitable format for storing such design structures. Design structure 520 may comprise information such as, for example, test data files, design content files, manufacturing data, layout parameters, wires, levels of metal, vias, shapes, data for routing through the manufacturing line, and any other data required by a semiconductor manufacturer to produce an embodiment of the invention as shown in FIGS. 1A-1E, 2, 3A, and 4. Design structure 520 may then proceed to a stage 522 where, for example, design structure 520 proceeds to tape-out, is released to manufacturing, is released to a mask house, is sent to another design house, is sent back to the customer, and the like.

While the present invention has been described with reference to the details of the embodiments of the invention shown in the drawing, these details are not intended to limit the scope of the invention as claimed in the appended claims.

What is claimed is:

1. A method for implementing serial link training sequences for training a serial link in an interconnect system, said method comprising:
   providing a transmit device with the serial link for transmitting data;
   providing a receiver device with the serial link for receiving data;
   said transmit device, transmitting a training sequence (TS) pattern;
   said transmit device, transmitting random data for a predefined time duration;
   said transmit device, repeating the steps of transmitting the TS-pattern, and transmitting the random data for the predefined time duration; said receiver device performing receiver initialization steps,
   said transmit device, advancing to a next TS-pattern when said receiver device detects a current TS-pattern and said receiver device being ready for initialization to advance; and
   said transmit device, repeating the steps of transmitting the next TS-pattern, and transmitting the random data for the predefined time duration, said receiver device performing receiver initialization steps.

2. The method for implementing serial link training sequences as recited in claim 1 wherein providing a transmit device includes providing a transmit Linear Feedback Shift Register (LFSR) with the serial link for transmitting data, said transmit Linear Feedback Shift Register (LFSR) transmitting the random data for the predefined time duration; and wherein said transmit device and said receiver device continue with said transmit device, advancing to a next TS-pattern when said receiver device detects a current TS-pattern and said receiver device being ready for initialization to advance; and said transmit device, repeating the steps of transmitting the next TS-pattern, and transmitting the random data for the predefined time duration, said receiver device performing receiver initialization steps until a final TS-pattern is transmitted.

3. The method for implementing serial link training sequences as recited in claim 1 wherein providing a receiver device includes providing said receiver device for receiving the transmitted TS-pattern and the transmitted random data.

4. The method for implementing serial link training sequences as recited in claim 1 wherein transmitting random data for a predefined time duration includes providing said predefined time duration of the transmitted random data substantially greater than a time interval of each transmitted TS-pattern.

5. The method for implementing serial link training sequences as recited in claim 1 wherein transmitting random data for a predefined time duration includes providing said predefined time duration of the transmitted random data approximately equal to ten times a time interval of each transmitted TS-pattern.

6. The method for implementing serial link training sequences as recited in claim 1 wherein transmitting random data for a predefined time duration includes providing a periodicity for random data generation greater than an overall time interval for performing the serial link training sequences.

7. The method for implementing serial link training sequences as recited in claim 1 wherein said receiver device detects a plurality of the training sequence (TS) patterns separated by the predefined time interval.

8. The method for implementing serial link training sequences as recited in claim 1 wherein said receiver device detects a plurality of the training sequence (TS) patterns separated by the predefined time interval, and said receiver device performing receiver initialization steps.

9. The method for implementing serial link training sequences as recited in claim 1 wherein said receiver device detects a plurality of the training sequence (TS) patterns separated by the predefined time interval and performs a plurality of receiver initialization steps including acquiring byte lock.

10. A circuit for implementing serial link training sequences for training a serial link in an interconnect system comprising:
a link interface coupled to the serial link, said link interface including a transmit device coupled to the serial link for transmitting data and a receiver device coupled to the serial link for receiving data;
said transmit device, transmitting a training sequence (TS) pattern;
said transmit device, transmitting random data for a predefined time duration;
said transmit device, repeating the steps of transmitting the TS-pattern, and transmitting the random data for the predefined time duration; said receiver device performing receiver initialization steps,
said transmit device, advancing to a next TS-pattern when said receiver device detects a current TS-pattern and said receiver device being ready for initialization to advance; and
said transmit device, repeating the steps of transmitting the next TS-pattern, and transmitting the random data for the predefined time duration, said receiver device performing receiver initialization steps.

11. The circuit for implementing serial link training sequences as recited in claim 10 wherein said receiver device detects a plurality of the training sequence (TS) patterns separated by the predefined time interval.

12. The circuit for implementing serial link training sequences as recited in claim 11 wherein said receiver device performs a plurality of receiver initialization steps including acquiring byte lock; and wherein said transmit device and said receiver device continue with said transmit device, advancing to a next TS-pattern when said receiver device detects a current TS-pattern and said receiver device being ready for initialization to advance; and said transmit device, repeating the steps of transmitting the next TS-pattern, and transmitting the random data for the predefined time duration, said receiver device performing receiver initialization steps until a final TS-pattern is transmitted.

13. The circuit for implementing serial link training sequences as recited in claim 11 wherein said transmit device includes a transmit Linear Feedback Shift Register (LFSR) coupled to the serial link for transmitting data, said transmit Linear Feedback Shift Register (LFSR) transmitting the random data for the predefined time duration.

14. The circuit for implementing serial link training sequences as recited in claim 11 wherein said predefined time duration of the transmitted random data is substantially greater than a time interval of each transmitted TS-pattern.

15. The circuit for implementing serial link training sequences as recited in claim 11 wherein said transmit device transmitting random data includes said transmit device providing a periodicity for random data generation greater than an overall time interval for performing the serial link training sequences.

16. A multiple-path local rack interconnect system comprising:
a plurality of interconnect chips;
a plurality of serial links connected between each of said plurality of interconnect chips;
each of said interconnect chips including a link interface for implementing serial link training sequences, said link interface coupled to the serial link, said link interface including a transmit device coupled to the serial link for transmitting data and a receiver device coupled to the serial link for receiving data;
said transmit device, transmitting a training sequence (TS) pattern;
said transmit device, transmitting random data for a predefined time duration; and
said transmit device, repeating the steps of transmitting the TS-pattern, and transmitting the random data for the predefined time duration, said receiver device performing receiver initialization steps,
said transmit device, advancing to a next TS-pattern when said receiver device detects a current TS-pattern and said receiver device being ready for initialization to advance; and
said transmit device, repeating the steps of transmitting the next TS-pattern, and transmitting the random data for the predefined time duration, said receiver device performing receiver initialization steps.

17. The multiple-path local rack interconnect system as recited in claim 16 wherein said transmit device of said link interface includes a transmit Linear Feedback Shift Register (LFSR) coupled to the serial link for transmitting data, said transmit Linear Feedback Shift Register (LFSR) transmitting the random data for the predefined time duration and wherein said transmit device and said receiver device continue with said transmit device, advancing to a next TS-pattern when said receiver device detects a current TS-pattern and said receiver device being ready for initialization to advance; and said transmit device, repeating the steps of transmitting the next TS-pattern, and transmitting the random data for the predefined time duration, said receiver device performing receiver initialization steps until a final TS-pattern is transmitted.

18. The multiple-path local rack interconnect system as recited in claim 16 wherein said receiver device of said link interface includes a receive Linear Feedback Shift Register (LFSR) coupled to the serial link for receiving data; said receiver device detects a plurality of the training sequence (TS) patterns separated by the predefined time interval, and said receiver device performs a plurality of receiver initialization steps including acquiring byte lock.

19. The multiple-path local rack interconnect system as recited in claim 16 wherein said predefined time duration of the transmitted random data is substantially greater than a time interval of each transmitted TS-pattern.

20. A design structure embodied in a machine readable medium used in a design process, the design structure comprising:

a circuit tangibly embodied in the machine readable medium used in the design process, said circuit for implementing serial link training sequences for training a serial link, said circuit comprising:

a link interface coupled to the serial link, said link interface including a transmit device coupled to the serial link for transmitting data and a receiver device coupled to the serial link for receiving data;

said transmit device, transmitting a training sequence (TS) pattern;

said transmit device, transmitting random data for a predefined time duration; and said transmit device, repeating the steps of transmitting the TS-pattern, and transmitting the random data for the predefined time duration, said receiver device performing receiver initialization steps, said transmit device, advancing to a next TS-pattern when said receiver device detects a current TS-pattern and said receiver device being ready for initialization to advance; and said transmit device, repeating the steps of transmitting the next TS-pattern, and transmitting the random data for the predefined time duration, said receiver device performing receiver initialization steps, wherein the design structure, when read and used in the manufacture of a semiconductor chip produces a chip comprising said circuit.

21. The design structure of claim 20, wherein the design structure comprises a netlist, which describes said circuit.

22. The design structure of claim 20, wherein the design structure resides on storage medium as a data format used for the exchange of layout data of integrated circuits.

23. The design structure of claim 20, wherein the design structure includes at least one of test data files, characterization data, verification data, or design specifications.

24. The design structure of claim 20, wherein said transmit device and said receiver device continue with said transmit device, advancing to a next TS-pattern when said receiver device detects a current TS-pattern and said receiver device being ready for initialization to advance; and said transmit device, repeating the steps of transmitting the next TS-pattern, and transmitting the random data for the predefined time duration, said receiver device performing receiver initialization steps until a final TS-pattern is transmitted; and wherein said receiver device detects a plurality of the training sequence (TS) patterns separated by the predefined time interval and performs a plurality of receiver initialization steps including acquiring byte lock.

* * * * *